128,373

UNITED STATES PATENT OFFICE.

JOHN D. DOYLE, OF ROCHESTER, NEW YORK.

IMPROVEMENT IN MEDICAL COMPOUNDS.

Specification forming part of Letters Patent No. 128,373, dated June 25, 1872.

Specification describing a certain Improvement in Medical Compounds, denominated "Hop Bitters," invented by JOHN D. DOYLE, of the city of Rochester, in the county of Monroe and State of New York.

My improvement is intended for general debility, loss of appetite, urinary diseases, &c., where a tonic is required. The invention consists in the combination of the decoctions of buchu and hops with an admixture of liquor, the whole compounded as hereinafter described.

The formula is as follows: To one ounce of long-leaved buchu add two quarts of boiling water, steep thirty minutes, strain and make the decoction two quarts by adding water. To two ounces of hops add two quarts of boiling water, steep twenty-five minutes, strain, and make the decoction two quarts by adding water.

Of these two decoctions take the following proportions by weight: Decoction buchu, one-sixth or one ounce; decoction hops, two-sixths or two ounces; liquor, three-sixths or three ounces. These proportions may be varied more or less.

The liquor may be whisky, brandy, or any other of a like nature which will answer as a preservative. The compound thus made is thoroughly mixed and then tightly bottled and is fit for use.

This compound is particularly applicable to urinary diseases, general debility, and all those complaints where a mild tonic is required.

The virtues of buchu in all diseases of the urinary organs is well known. Hops have also a special effect upon these organs, especially in cases of gravel and diseases of the bladder. Its bitter principle is of great advantage as a bitters, and it acts, in a considerable degree, as a narcotic and anodyne.

The combination of these two elements as named, is new so far as I am aware, and they act in unison in producing a special effect.

In addition to the above there is a chemical union of the parts. The decoction of hops acts as a preservative. The tannin of the hops unites with the albumen of the compound and helps to clarify the liquid. It also prevents fermentation, and counteracts the tendency to sour. This is the result of the tendency of the tannin to coagulate the albumen, and to the unfermentable properties of the bitter principle.

Any desired flavor may be added to the compound.

What I claim, and desire to secure by Letters Patent, is—

The medical compound, called "hop bitters," herein described, composed of the ingredients in the proportions substantially as specified, and prepared in the manner and for the purposes set forth.

In witness whereof I have hereunto signed my name in the presence of two subscribing witnesses.

JOHN D. DOYLE.

Witnesses:
    R. F. OSGOOD,
    ARCHIE BAINE.